(12) United States Patent
Suzuki et al.

(10) Patent No.: US 8,340,367 B2
(45) Date of Patent: Dec. 25, 2012

(54) IMAGE PROCESSING APPARATUS, IMAGE PROCESSING METHOD, IMAGE PROCESSING PROGRAM, IMAGE CAPTURING APPARATUS, AND CONTROLLING METHOD THEREOF

(75) Inventors: Yoshihiro Suzuki, Kanagawa (JP); Kyoko Fukuda, Kanagawa (JP)

(73) Assignee: Sony Corporation (JP)

( * ) Notice: Subject to any disclaimer, the term of this patent is extended or adjusted under 35 U.S.C. 154(b) by 1092 days.

(21) Appl. No.: 12/290,317

(22) Filed: Oct. 29, 2008

(65) Prior Publication Data

US 2009/0116705 A1 May 7, 2009

(30) Foreign Application Priority Data

Nov. 1, 2007 (JP) ................................ P2007-285022

(51) Int. Cl.
*G06K 9/00* (2006.01)
(52) U.S. Cl. ..................... 382/118; 382/103; 382/167
(58) Field of Classification Search .................. 348/371; 382/103, 118, 167
See application file for complete search history.

(56) References Cited

U.S. PATENT DOCUMENTS

| | | | |
|---|---|---|---|
| 6,389,155 B2* | 5/2002 | Funayama et al. | 382/118 |
| 7,522,768 B2* | 4/2009 | Bhatti et al. | 382/167 |
| 7,650,045 B2* | 1/2010 | Yano | 382/274 |
| 7,693,301 B2* | 4/2010 | Li et al. | 382/103 |
| 8,026,976 B2* | 9/2011 | Tamura | 348/371 |
| 2005/0135679 A1* | 6/2005 | Yoon et al. | 382/190 |
| 2005/0280809 A1 | 12/2005 | Hidai et al. | |
| 2006/0029265 A1* | 2/2006 | Kim et al. | 382/118 |
| 2007/0201747 A1* | 8/2007 | Yamada et al. | 382/199 |
| 2009/0116705 A1* | 5/2009 | Suzuki et al. | 382/118 |

FOREIGN PATENT DOCUMENTS

| | | |
|---|---|---|
| JP | 2004-030629 A | 1/2004 |
| JP | 2005-157679 A | 6/2005 |

* cited by examiner

*Primary Examiner* — Gregory M Desire
(74) *Attorney, Agent, or Firm* — Lerner, David, Littenberg, Krumholz & Mentlik, LLP

(57) ABSTRACT

An image processing apparatus includes an image converting section, a scanning controlling section, an image memory, and an object detection processing section. The image converting section converts a size of input image data. The scanning controlling section stores the size-converted image data, performs a scanning process of moving a square region having a predetermined size in the size-converted image data, and successively extracts square region image data. The image memory stores the square region image data which have been extracted by the scanning controlling section. The object detection processing section which detects an object region from the extracted square region image data. The image memory stores a plurality of entries of object candidate image data containing object regions of a plurality of object candidates. The object detection processing section performs an object determining process of determining whether or not the square region image data contain an object region.

13 Claims, 13 Drawing Sheets

Fig. 8

| FACE CANDIDATE | POSITION | | | SIZE | LIKELIHOOD VALUE |
|---|---|---|---|---|---|
| | IMAGE | X COORDINATE | Y COORDINATE | | |
| 1 | $P_{11}$ | $X_{11}$ | $Y_{11}$ | $S_{11}$ | LIKELIHOOD VALUE 11 |
| | $P_{12}$ | $X_{12}$ | $Y_{12}$ | $S_{12}$ | LIKELIHOOD VALUE 12 |
| | $P_{13}$ | $X_{13}$ | $Y_{13}$ | $S_{13}$ | LIKELIHOOD VALUE 13 |
| 2 | $P_{21}$ | $X_{21}$ | $Y_{21}$ | $S_{21}$ | LIKELIHOOD VALUE 21 |
| | $P_{22}$ | $X_{22}$ | $Y_{22}$ | $S_{22}$ | LIKELIHOOD VALUE 22 |
| | $P_{23}$ | $X_{23}$ | $Y_{23}$ | $S_{23}$ | LIKELIHOOD VALUE 23 |
| ⋮ | ⋮ | ⋮ | ⋮ | ⋮ | ⋮ |
| n | $P_{n1}$ | $X_{n1}$ | $Y_{n1}$ | $S_{n1}$ | LIKELIHOOD VALUE n1 |
| | $P_{n2}$ | $X_{n2}$ | $Y_{n2}$ | $S_{n2}$ | LIKELIHOOD VALUE n2 |
| | $P_{n3}$ | $X_{n3}$ | $Y_{n3}$ | $S_{n3}$ | LIKELIHOOD VALUE n3 |

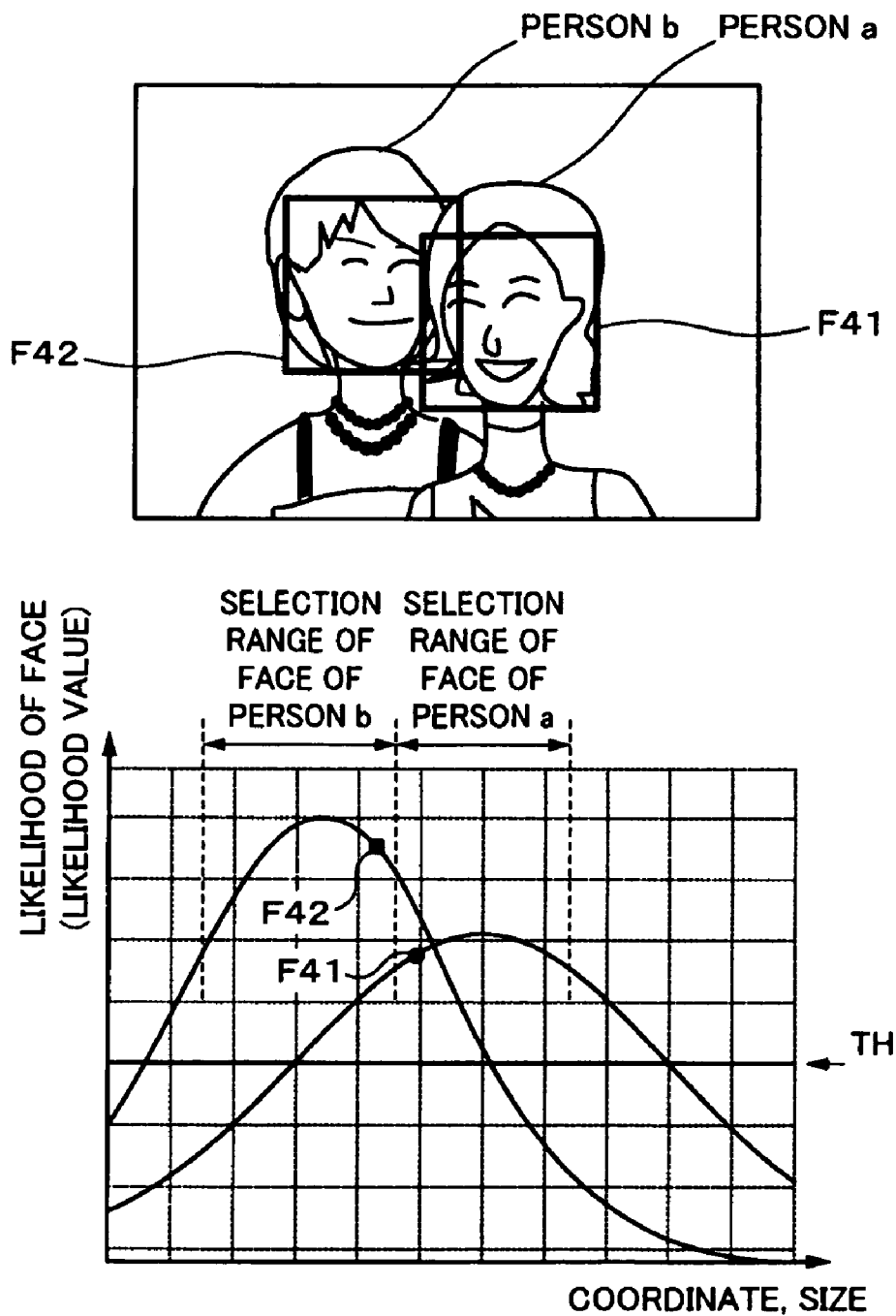

Fig. 13
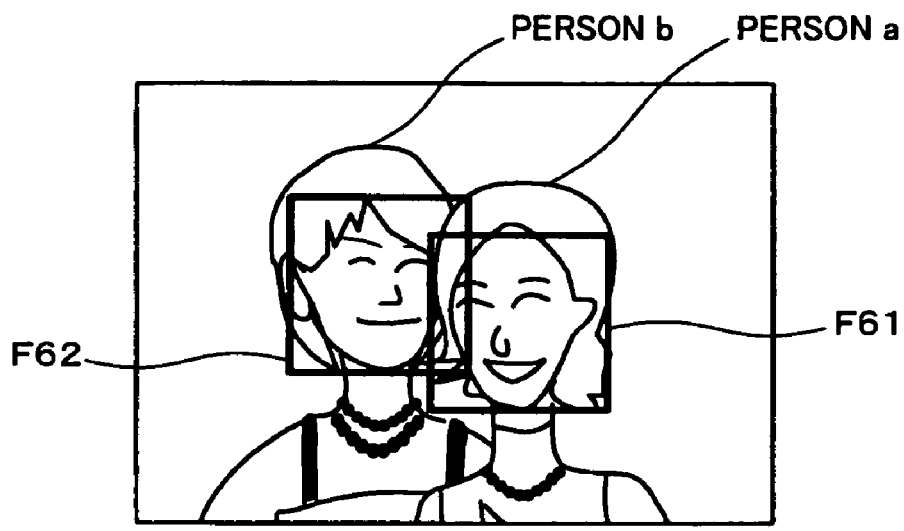
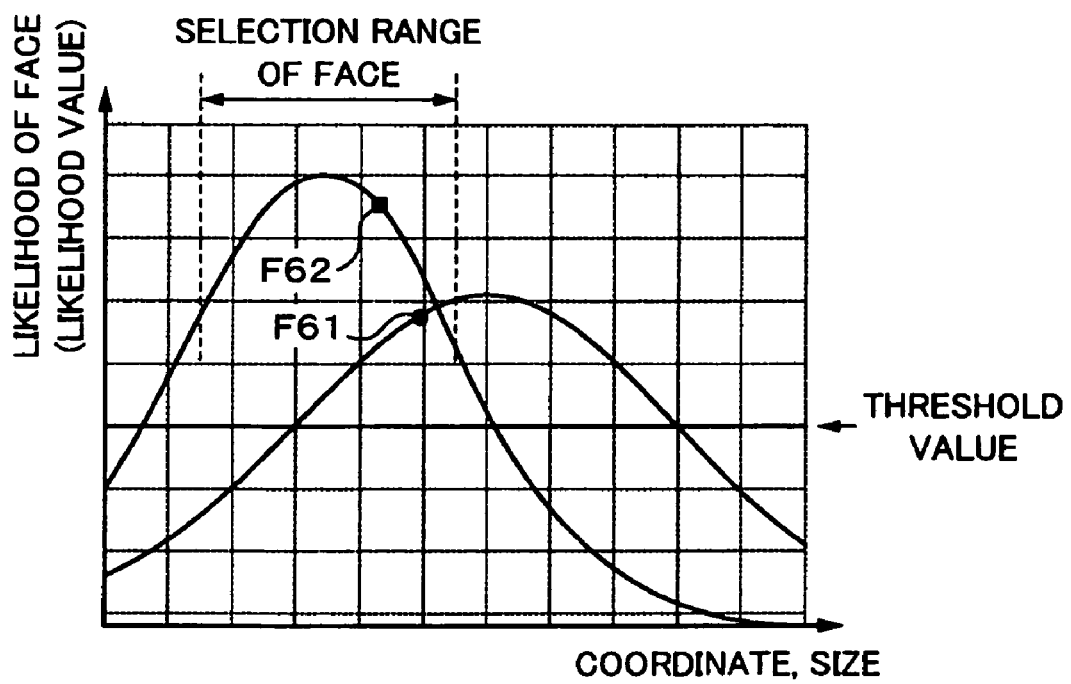

IMAGE PROCESSING APPARATUS, IMAGE PROCESSING METHOD, IMAGE PROCESSING PROGRAM, IMAGE CAPTURING APPARATUS, AND CONTROLLING METHOD THEREOF

CROSS REFERENCES TO RELATED APPLICATIONS

The present application claims priority from Japanese Patent Application No. JP 2007-285022, filed in the Japanese Patent Office on Nov. 1, 2007, the entire content of which is incorporated herein by reference.

BACKGROUND OF THE INVENTION

1. Field of the Invention

The present invention relates to an image processing apparatus, an image processing method, an image processing program, an image capturing apparatus and a controlling method thereof that detect a face region from an image.

2. Description of the Related Art

Recent digital still cameras that mainly capture still images and digital video cameras that mainly capture moving images are equipped with functions for detecting the face of a person to be captured, using the detected result for auto focus (AF), auto exposure (AE), and auto white balance (AWB) controls, and adjusting the skin color of the captured image.

To accurately use such functions, it is necessary to accurately detect the position and size of the face in addition to provide high detection rate of the face. If the position and size of the face are difficult to be accurately detected, a non-face image such as a part of the background may appear at the detected portion. As a result, the non-face image adversely affects calculation results of parameters of the AF, AE, AWB, and color adjustment controls.

For example, the patent document disclosed as Japanese Patent Application Laid-Open No. 2005-157679 (referred to as Patent Document 1) describes a method of determining whether or not the object to be captured is a face based on a likelihood value that represents likelihood of a face.

On the other hand, the patent document disclosed as Japanese Patent Application Laid-Open No. 2004-30629 (referred to as Patent Document 2) describes a method of scanning an image while gradually reducing its size and detecting the position and size of the face from the image.

In Patent Documents 1 and 2, by moving a square region having a predetermined size by $\Delta x$ in the horizontal direction and by $\Delta y$ in the vertical direction from the upper left end to the lower right end of the captured image, it is scanned as shown in FIG. 4 such that the position of a face is obtained. In addition, as shown in FIG. 3, by scanning images that are gradually reduced by predetermined reduction rate $\Delta r$, the size of the face is obtained.

Thereafter, by calculating all differences of luminance values of pixels of pre-learnt two points of all pixels of the square region having the predetermined size, likelihood values that represent likelihood of a face are obtained based on the calculated results. A threshold value based on which it is determined whether or not the object is a face is preset for likelihood values of square region images. If a calculated likelihood value is equal to or larger than the threshold value, it is determined that the object be a face. In contrast, if the likelihood value is smaller than the threshold value, it is determined that the object be not a face.

As shown in FIG. 5, if an image is scanned in the horizontal direction, the closer the square region image is to the X coordinate of the face, the larger the likelihood value of the real face is, the farther the square region image is from the X coordinate, the smaller the likelihood value of the real face is. In this example, since the likelihood values of square regions F2, F3, and F4 are equal to or larger than the preset threshold value, they are determined to be faces. On the other hand, since the likelihood values of square regions F1 and F5 are smaller than the threshold value, they are determined not to be faces.

In addition, as shown in FIG. 6, if an image is scanned in the vertical direction, the closer the square region face is to the Y coordinate of the face, the larger the likelihood value of the real face is, the farther the square region image is from the Y coordinate, the smaller the likelihood value of the real image is. In this example, since the likelihood values of square regions F12, F13, and F14 are equal to or larger than the threshold value, they are determined to be faces. In contrast, since the likelihood values of square regions F11 and F15 are smaller than the threshold value, they are determined not to be faces.

In addition, as shown in FIG. 7, if an image is reduced, the closer the reduced size of the image is to the real face size, the larger the likelihood value of the real face is, the more different the reduced size of the image is from the real face size, the smaller the likelihood value of the real face is. In this example, since the likelihood values of square regions F22, F23, F24, and F25 are equal to or larger than the threshold value, they are determined to be faces. On the other hand, since the likelihood value of square region F21 is smaller than the threshold value, it is determined not to be a face.

Thus, in the method of detecting an object from an image and determining whether or not the object is a face, by scanning an image, a plurality of faces having different likelihood values are detected for one face from the image. Consequently, it is necessary to extract a correct face from the detected faces. To extract a correct face, a method of selecting a face having the largest likelihood value from the detected faces may be used.

SUMMARY OF THE INVENTION

However, in the methods of Patent Documents 1 and 2 above, since an image is discretely scanned by a square region, a face having the largest likelihood value in detected faces may not represent the position and size of the real face.

For example, if a face having the largest likelihood value in detected faces is a detected result, in the example shown in FIG. 5, a face of square region F3 is extracted. In the example shown in FIG. 6, a face of square region F13 is extracted. In the example shown in FIG. 7, a face of square region F23 is extracted. Since the faces extracted in these examples are those having the largest likelihood values in images, namely they are not at the apexes of graphs that represent likelihood values, they differ from the position and size of the real face. Thus, there arises an error between the position and size of the real face and those of a face as a detected result.

It seems that such a problem can be solved by setting moving amounts $\Delta x$ and $\Delta y$, by which an image is scanned, to as close to 0 as possible, setting image reduction rate $\Delta r$ to as close to 1 as possible, and nearly successively scanning the image. However, if an image is successively scanned, the number of times of a process of detecting a face remarkably increases. As a result, the process time increases.

As another method, it seems that such a problem can be solved by calculating averages of the positions and sizes of detected faces. However, since the likelihood value of a detected face close to the threshold value is low, the reliability of the position and size of the face is low. Thus, if images having low likelihood values close to the threshold value are used for averages, an error between the position and size of the detected result and those of the real face becomes large.

Moreover, in the methods described in Patent Documents 1 and 2, it is determined whether or not the object is a face based on likelihood values. Thus, if the faces of a plurality of persons are close, for example, they are close together and approach their faces to each other, the faces of the detected plurality of persons may be determined to be the face of one person and thereby the face of a different person may be determined to be a detected result.

As shown in FIG. 13, it is considered that two people, person a and person b, are close together and they approach their faces to each other. If a face is detected from such an image, a plurality of faces are detected from the faces of person a and person b and likelihood values of the faces that have been detected are compared and a face having the largest likelihood value is extracted as a detected result. In this example, square region F61 that represents a detected result of the face of person a and square region F62 that represents a detected result of the face of person b are compared and the image of square region F62 having the larger likelihood value than the other is extracted as a detected result of the face of person a. In other words, the face of person b adjacent to person a is detected as the face of person a.

Thus, in the related art, if the faces of a plurality of persons are close to each other, the face of an adjacent person may be erroneously detected.

In view of the foregoing, it would be desirable to provide an image processing apparatus, an image processing method, and image processing program, an image capturing apparatus and a controlling method thereof that can more accurately detect a face region from a captured image than those of the related art.

According to an embodiment of the present invention, there is provided an image processing apparatus including an image converting section, a scanning controlling section, an image memory, and a face detection processing section. The image converting section converts a size of input image data. The scanning controlling section stores the size-converted image data, performs a scanning process of moving a square region having a predetermined size in the size-converted image data, and successively extracts square region image data. The image memory stores the square region image data which have been extracted by the scanning controlling section. The face detection processing section detects a face region from the extracted square region image data. The image memory stores a plurality of entries of face candidate image data containing face regions of a plurality of face candidates. The face detection processing section performs a face determining process of determining whether or not the square region image data contain a face region. If a determined result of the face determining process denotes that the square region image data contain the face region, the face detection processing section performs an identity determining process of setting an identity determination frame of which a predetermined width in a horizontal direction and a predetermined width in a vertical direction are added to face candidate image data for a predetermined face candidate stored in the image memory and determining whether or not the square region image data are contained in the identity determination frame.

According to an embodiment of the present invention, there is provided an image processing method. A size of input image data is converted. The size-converted image data are stored to an image memory. A scanning process of moving a square region having a predetermined size in the size-converted image data is performed. Square region image data are successively extracted. A face region is detected from the extracted square region image data. The image memory stores a plurality of entries of face candidate image data containing face regions of a plurality of face candidates. The face detection processing section includes a face determining process of determining whether or not the square region image data contain a face region, and if a determined result of the face determining process denotes that the square region image data contain the face region, an identity determining process of setting an identity determination frame of which a predetermined width in a horizontal direction and a predetermined width in a vertical direction are added to face candidate image data for a predetermined face candidate stored in the image memory and determining whether or not the square region image data are contained in the identity determination frame.

According to an embodiment of the present invention, there is provided an image processing program which causes a computer to execute an image processing method. A size of input image data is converted. The size-converted image data are stored to an image memory. A scanning process of moving a square region having a predetermined size in the size-converted image data is performed. Square region image data are successively extracted. A face region is detected from the extracted square region image data. The image memory stores a plurality of entries of face candidate image data containing face regions of a plurality of face candidates. The face detection processing section includes a face determining process of determining whether or not the square region image data contain a face region, and if a determined result of the face determining process denotes that the square region image data contain the face region, an identity determining process of setting an identity determination frame of which a predetermined width in a horizontal direction and a predetermined width in a vertical direction are added to face candidate image data for a predetermined face candidate stored in the image memory and determining whether or not the square region image data are contained in the identity determination frame.

According to an embodiment of the present invention, there is provided an image capturing apparatus including an image capturing section, a camera signal processing section, and a face detecting section. The image capturing section captures light from an object and outputs a captured image signal. The camera signal processing section performs a signal process for the captured image signal which is output from the image capturing section and outputs image data. The face detecting section performs a face detecting process for the image data. The face detecting section includes an image converting section which converts a size of the image data, a scanning controlling section which stores the size-converted image data, performs a scanning process of moving a square region having a predetermined size in the size-converted image data, and successively extracts square region image data, an image memory which stores the square region image data which have been extracted by the scanning controlling section, and a face detection processing section which detects a face region from the extracted square region image data. The image memory stores a plurality of entries of face candidate image data containing face regions of a plurality of face candidates. The face detection processing section performs a face determining process of determining whether or not the square region image data contain a face region. If a determined result of the face determining process denotes that the square region image data contain the face region, the face detection processing section performs an identity determining process of setting an identity determination frame of which a predetermined width in a horizontal direction and a predetermined width in a vertical direction are added to face candidate image data for a predetermined face candidate stored in the image memory and determining whether or not the square region image data are contained in the identity determination frame.

According to an embodiment of the present invention, there is provided a controlling method of an image capturing apparatus. Light is captured from an object. A captured image signal is output. A signal process for the captured image signal which is output at the image capturing step is performed. Image data are output. A face detecting process for the image data is performed. In the face detecting step, a size of the image data is converted, the size-converted image data are stored to an image memory, a scanning process of moving a square region having a predetermined size in the size-converted image data is performed, square region image data are successively extracted, and a face region is detected from the extracted square region image data. The image memory stores a plurality of entries of face candidate image data containing face regions of a plurality of face candidates. The face detection processing step includes a face determining process of determining whether or not the square region image data contain a face region, and if a determined result of the face determining process denotes that the square region image data contain the face region, an identity determining process of setting an identity determination frame of which a predetermined width in a horizontal direction and a predetermined width in a vertical direction are added to face candidate image data for a predetermined face candidate stored in the image memory and determining whether or not the square region image data are contained in the identity determination frame.

According to embodiments of the present invention, a size of input image data is converted. The size-converted image data are stored to an image memory. A scanning process of moving a square region having a predetermined size in the size-converted image data is performed. Square region image data are successively extracted. A face region is detected from the extracted square region image data. The image memory stores a plurality of entries of face candidate image data containing face regions of a plurality of face candidates. The face detection processing section includes a face determining process of determining whether or not the square region image data contain a face region, and if a determined result of the face determining process denotes that the square region image data contain the face region, an identity determining process of setting an identity determination frame of which a predetermined width in a horizontal direction and a predetermined width in a vertical direction are added to face candidate image data for a predetermined face candidate stored in the image memory and determining whether or not the square region image data are contained in the identity determination frame. Thus, a face to be determined can be distinguished from a face adjacent thereto.

According to embodiments of the present invention, light is captured from an object. A captured image signal is output. A signal process for the captured image signal which is output at the image capturing step is performed. Image data are output. A face detecting process for the image data is performed. In the face detecting step, a size of the image data is converted, the size-converted image data are stored to an image memory, a scanning process of moving a square region having a predetermined size in the size-converted image data is performed, square region image data are successively extracted, and a face region is detected from the extracted square region image data. The image memory stores a plurality of entries of face candidate image data containing face regions of a plurality of face candidates. The face detection processing step includes a face determining process of determining whether or not the square region image data contain a face region, and if a determined result of the face determining process denotes that the square region image data contain the face region, an identity determining process of setting an identity determination frame of which a predetermined width in a horizontal direction and a predetermined width in a vertical direction are added to face candidate image data for a predetermined face candidate stored in the image memory and determining whether or not the square region image data are contained in the identity determination frame. Thus, a face to be determined can be distinguished from a face adjacent thereto.

According to embodiments of the present invention, since the identity determining process is performed for square region image data determined to contain a face region in the face determining process with face candidate image data stored in the image memory, by distinguishing a face to be determined from a face adjacent thereto, it can be prevented from being erroneously detected. Thus, as an effect of the embodiments of the present invention, the face to be determined can be more accurately detected.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 8 is a schematic diagram showing an exemplary face candidate database;

FIG. 10 is a schematic diagram describing a method of detecting a face from those that are close to each other;

FIG. 13 is a schematic diagram describing a method of detecting a face from those that are close to each other.

DETAILED DESCRIPTION OF THE PREFERRED EMBODIMENTS

Figure 1:
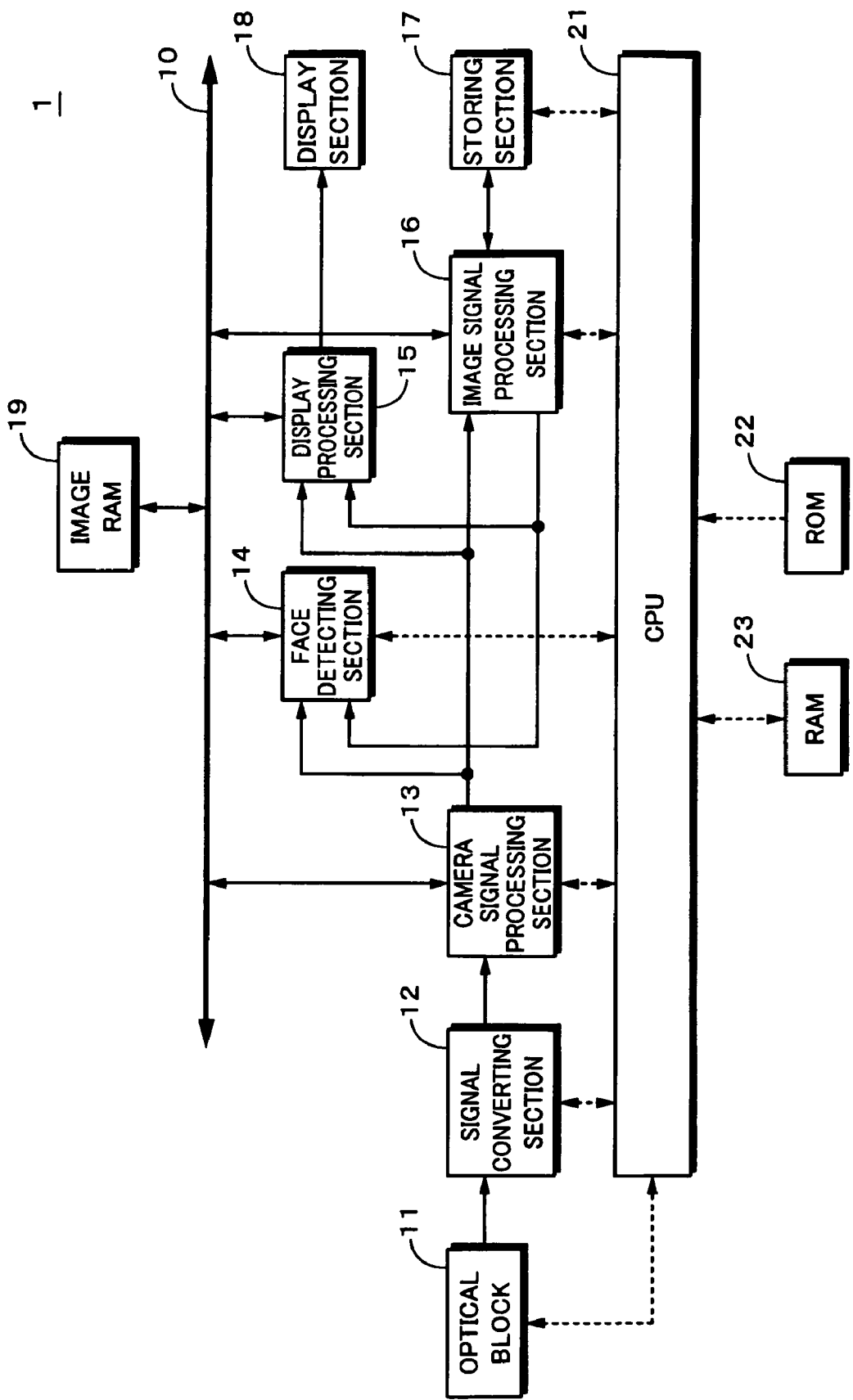
FIG. 1 is a block diagram showing an exemplary structure of an image capturing apparatus according to an embodiment of the present invention.

Next, with reference to the accompanying drawings, embodiments of the present invention will be described. FIG. 1 shows an exemplary structure of an image capturing apparatus 1 according to an embodiment of the present invention.

The image capturing apparatus 1 has an image bus 10, an optical block 11, a signal converting section 12, a camera signal processing section 13, a face detecting section 14, a display processing section 15, an image signal processing section 16, a storing section 17, a display section 18, an image random access memory (RAM) 19, a central processing unit (CPU) 21, a read only memory (ROM) 22, and a RAM 23.

The optical block 11 includes a lens group, an aperture adjusting mechanism, a focus adjusting mechanism, a zoom mechanism, a shutter mechanism, a flash mechanism, and so forth that capture an object. The optical block 11 performs, for example, zoom, shutter, and exposure controls according to control signals supplied from the CPU 21 that will be described later.

The signal converting section 12 is composed of an image capturing device such as a charge coupled device (CCD) or a complementary metal oxide semiconductor (CMOS) image sensor. An image that passes through the optical block 11 is focused on a focusing plane of the signal converting section 12. The signal converting section 12 receives an image capturing timing signal from the CPU 21, for example, according to a shutter operation, converts an object image focused on the focusing plane into a captured image signal, and supplies the converted signal to the camera signal processing section 13.

The camera signal processing section 13 performs a various types of signal processes for the captured image signal that is output from the signal converting section 12 based on the control signals supplied from the CPU 21. Specifically, the camera signal processing section 13 performs, for example, gamma correction and auto gain control (AGC) for the captured image signal supplied from the signal converting section 12 and performs a process of converting the captured image signal into a video signal as a digital signal. In addition, the camera signal processing section 13 also performs white balance control, exposure correcting control, and so forth for the video signal based on the control signals supplied from the CPU 21.

The face detecting section 14 receives image data from the camera signal processing section 13 through the image RAM 19, detects a region for the face of a person from the received image data, and supplies the detected result to the CPU 21. The structure of the face detecting section 14 and the face detecting process of the face detecting section 14 will be described later.

The display processing section 15 receives image data from the camera signal processing section 13 and the image signal processing section 16, which will be described later, through the image RAM 19, converts the image data into an image having a resolution suitable to be displayed, and supplies the converted image to the display section 18. The display section 18 is used as a view finder of the image capturing apparatus 1 and also as a monitor for an image reproduced from the storing section 17. The display section 18 is, for example, a liquid crystal display (LCD).

The image signal processing section 16 receives image data from the camera signal processing section 13 through the image RAM 19, compression-encodes the image data, and outputs the encoded data as a moving image data file or a still image data file to the storing section 17. In addition, the image signal processing section 16 decodes an image data file that is read from the storing section 17, which will be described later, and supplies the decoded file to the display processing section 15 through the image RAM 19. As a moving image encoding system, Moving Picture Experts Group (MPEG) system can be used and as a still image encoding system, Joint Photographic Experts Group (JPEG) system can be used.

The storing section 17 stores an image file that has been encoded and generated by the image signal processing section 16. Examples of the storing section 17 include a drive device for a portable record medium (eg, a magnetic tape, an optical disc) and a hard disk drive (HDD). A image file is read from the storing section 17 to the image signal processing section 16. In addition, the storing section 17 supplies information associated with the image data file to the CPU 21.

The image RAM 19 is connected to the camera signal processing section 13, the face detecting section 14, the display processing section 15, and the image signal processing section 16 through the image bus 10. The image RAM 19 is shared by these connected processing blocks. Image data are exchanged among these blocks through the image RAM 19. In this example, it is assumed that these processing blocks exchange image data to each other through the image RAM 19. Instead, the face detecting section 14 and the display processing section 15 may receive image data from the camera signal processing section 13 and the image signal processing section 16 directly, not through the image bus 10.

The CPU 21 controls the entire image capturing apparatus 1 according to a program stored in the ROM 22 with the RAM 23 as a work memory. For example, the CPU 21 exchanges commands and data with individual sections of the image capturing apparatus 1 and controls them according to the commands. In addition, the CPU 21 generates control signals for focus, aperture, and zoom controls of the optical block 11 based on control signals according to operations of an operating section (not shown), a captured image signal, and so forth and supplies the control signals to the optical block 11.

Figure 2:
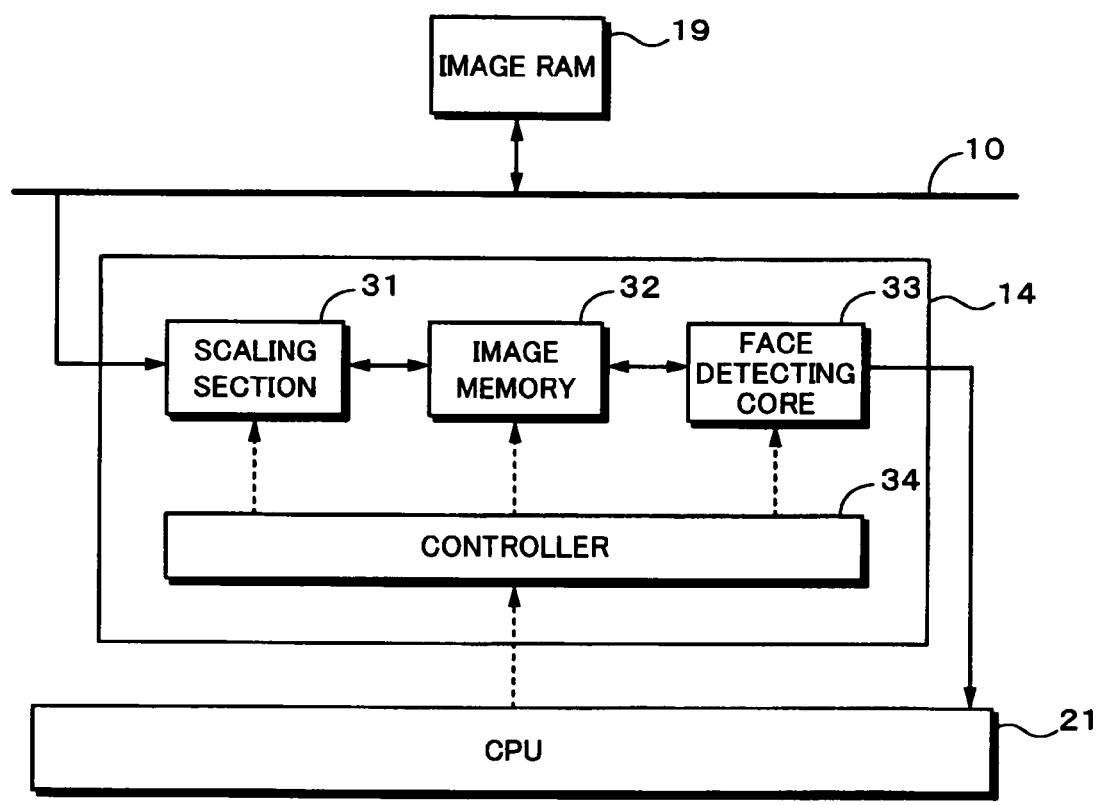
FIG. 2 is a block diagram showing an exemplary structure of a face detecting section.

FIG. 2 shows an exemplary structure of the face detecting section 14. The face detecting section 14 has a scaling section 31 and an image memory 32 as an image converting section; and a face detecting core 33 and a controller 34 as a face detection processing section. The scaling section 31 performs a scaling process that enlarges or reduces the size (numbers of pixels in the horizontal and vertical directions) of image data that are read from the image RAM 19 through the image bus 10 such that the image data are suitable for the face detecting process of the face detecting core 33 and supplies the enlarged or reduced image data to the image memory 32.

The image memory 32 temporarily stores the image data that have been size-converted by the scaling section 31. The image memory 32 performs a scanning process of extracting square region image data having a predetermined size from a designated position of the size-converted image data under the control of the controller 34 and supplies the extracted image data to the face detecting core 33.

The face detecting core 33 performs a face detecting process for the square region image data supplied from the image memory 32. The face detecting process that the face detecting core 33 performs includes a face determining process, an overlap determining process, an identity determining process, a detection likelihood determining process, and a detected result correcting process. Details of these processes that the face detecting core 33 performs as the face detecting process will be described later. The controller 34 controls individual sections of the face detecting section 14 under the control of the CPU 21, for example, to designate an image data reduction rate (or enlargement rate) of the scaling section 31 and designate write and read memory addresses of the image memory 32.

Next, an exemplary operation of the image capturing apparatus 1 having such a structure will be briefly described. When an image is recorded, light emitted from an object enters the image capturing device through the optical block 11. The image capturing device photoelectrically converts the light into an electric signal and successively supplies the electric signal as a captured image signal to the camera signal processing section 13. The camera signal processing section 13 performs a digital converting process, an image correcting process, and so forth for the captured image signal. The image data for which various types of processes have been performed are temporarily stored in the image RAM 19 through the image bus 10.

The display processing section 15 receives the image data from the camera signal processing section 13 through the image RAM 19, generates a display image signal, and supplies the image signal to the display section 18. Thus, an image that is being captured is displayed on the display section 18 and the user can check the angle of view with the image on the display section 18.

In addition, the image signal processing section 16 successively receives image data from the camera signal processing section 13 through the image RAM 19, performs compression-encoding process, for example, according to the MPEG system, generates a moving image file, and stores the moving image file to the storing section 17.

Instead, the image signal processing section 16 may compression-encode image data for one frame supplied from the camera signal processing section 13, for example, according to the JPEG system based on an operation of the shutter button on the operating section (not shown) and record the encoded image data to the storing section 17.

In contrast, when an image is reproduced, an image file is read from the storing section 17 by the image signal processing section 16. The image signal processing section 16 decodes the image file and supplies the decoded image file to the display processing section 15. The display processing section 15 converts the decoded image file into a display signal. As a result, a moving image or a still image can be reproduced and displayed on the display section 18.

When such an image is recorded, the face detecting section 14 receives image data from the camera signal processing section 13 through the image RAM 19 and executes a face detecting process for the image data. The detected result of a face by the face detecting section 14 is supplied to the CPU 21.

The CPU 21 performs controls including AE, AF, and white balance based on the detected result. The CPU 21 adjusts, for example, aperture value and white balance gain such that the brightness and color of the detected face become optimum. Instead, the CPU 21 can perform a control of focusing on the detected face.

When an image file is reproduced from the storing section 17, the face detecting section 14 may receive image data that has been decoded by the image signal processing section 16 through the image RAM 19 and execute the face detecting process for the image data. In this case, the individual processing blocks can perform the face detecting process in the same manner as they do when an image is recorded.

Next, a face detecting method according to an embodiment of the present invention will be described. The face detecting section 14 performs the face detecting process of more accurately detecting a face from image data. The face detecting process includes a scaling process of changing the size of image data that are input to the face detecting section 14 to generate reduced or enlarged image data; a scanning process of scanning image data to extract image data having a predetermined size; a face determining process of determining whether or not the extracted image data contain a face region; an overlap determining process of determining whether or not the image data determined to contain a face region overlap with face candidate image data; an identity determining process of determining whether or not the image data determined to overlap with the face candidate image data is identical thereto; a detection likelihood determining process of selecting a plurality of entries of image data determined to be closer to a face region from a plurality of entries of face candidate image data and image data determined to be identical with the face candidate image data; and a detected result correcting process of calculating the positions and sizes of the selected entries of image data.

Next, processes performed to detect a face will be described in details in the following order.
(1) Scaling process
(2) Scanning process
(3) Face determining process
(4) Overlap determining process
(5) Identity determining process
(6) Detection likelihood determining process
(7) Detected result correcting process (1) Scaling Process In the scaling process, captured image data are reduced (enlarged) by a predetermined reduction rate (enlargement rate). In the following, the case of which image data are reduced in the scaling process will be described.

Figure 3:
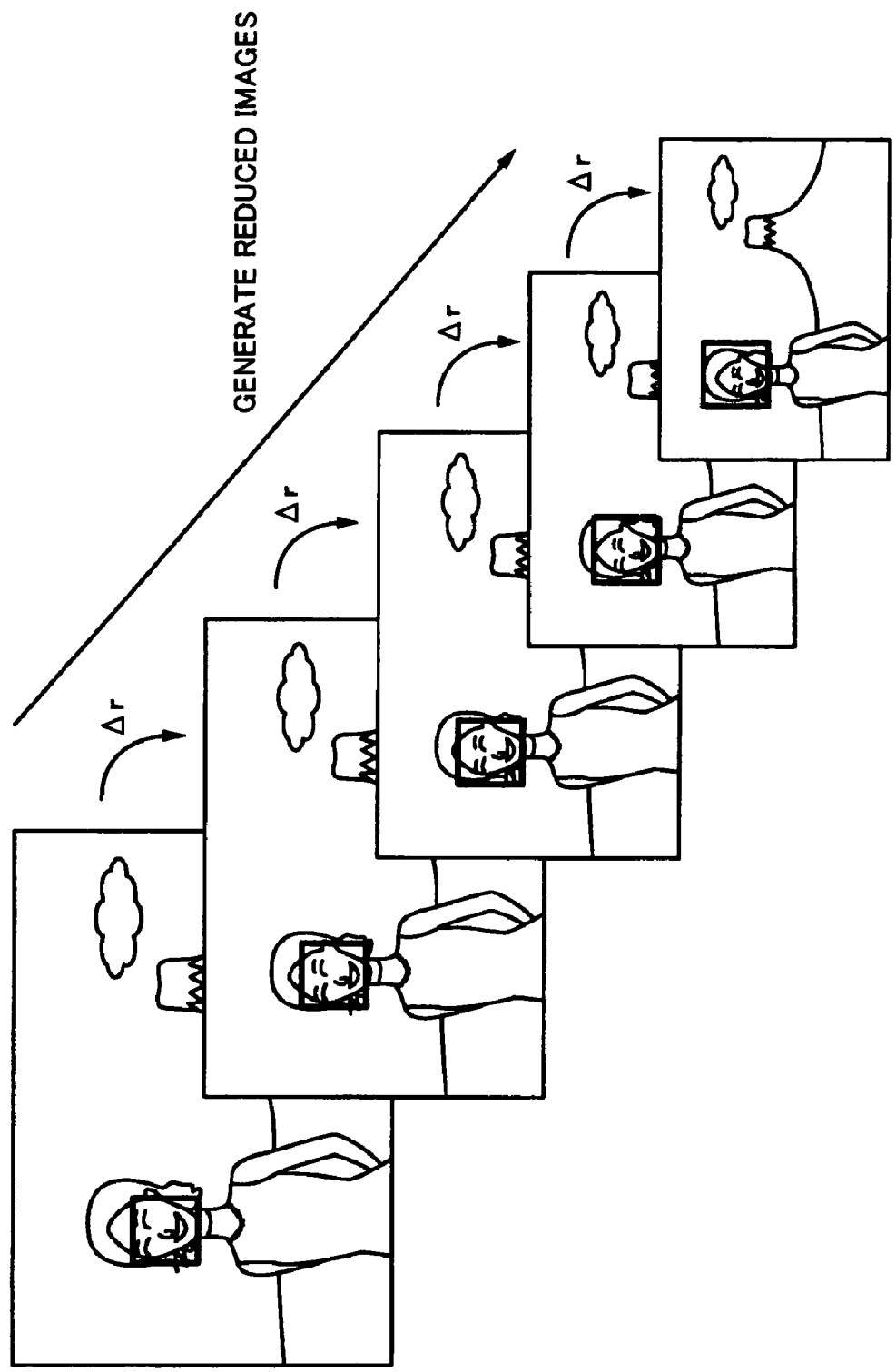
FIG. 3 is a schematic diagram describing a scaling process.

For example, when image data are input to the face detecting section 14 through the image RAM 19, the scaling section 31 generates reduced image data of which the image data are reduced by reduction rate $\Delta r$ as shown in FIG. 3. The reduced image data are stored in the image memory 32. Instead, the scaling section 31 can reduce image data that are input from the face detecting section 14 through the image RAM 19 by another reduction rate. Instead, the scaling section 31 can also reduce the foregoing reduced image data by the predetermined reduction rate $\Delta r$.

(2) Scanning Process

In the scanning process, reduced image data are scanned by moving a square region having a predetermined size by a predetermined amount in the horizontal direction and by a predetermined amount in the vertical direction to extract square region image data.

Figure 4:
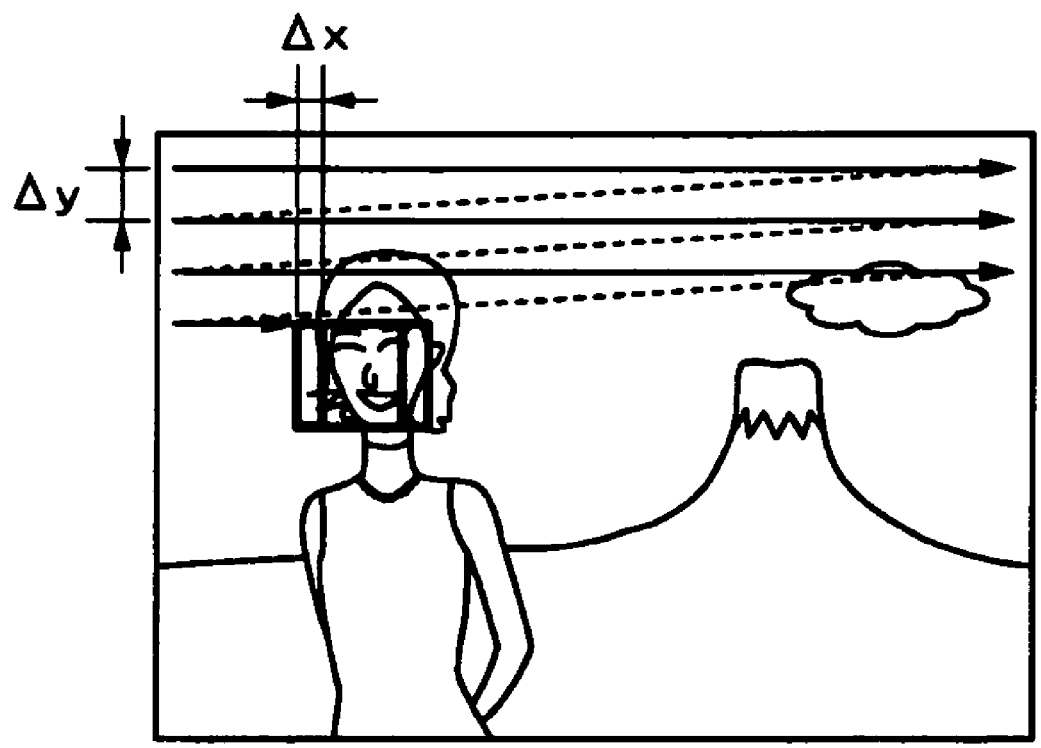
FIG. 4 is a schematic diagram describing a scanning process.

In the image memory 32, a square region having a predetermined size is moved from the upper left end of the reduced image data obtained in the scaling process by moving amount $\Delta x$ in the horizontal direction as shown in FIG. 4 under the control of the controller 34. When the square region is moved to the right end of the reduced image data, the square region is returned to the left end and moved in the vertical direction by moving amount $\Delta y$. Thereafter, the reduced image data are scanned in the horizontal direction. By successively scanning the reduced image data to the lower right end, square region image data are successively extracted. The extracted square region image data are supplied to the face detecting core 33.

It is assumed that the size of the square region by which the scanning process is performed is constant regardless of the size of image data. By changing the size of image data that are input to the face detecting section 14 and scanning the size-changed image data by the square region having the predetermined size, the size of a face detected in the square region is changed and thereby the real size of the face can be detected.

(3) Face Determining Process

In the face determining process, a predetermined calculating process is performed for predetermined pixels of the square region image data extracted by the scanning process to determine whether or not the square region image data contain a face region.

When square region image data are extracted from the reduced image data by the scanning process, the face detecting core 33 calculates the difference of luminance values of pre-learnt two pixels of those of the square region image data supplied from the image memory 32. In addition, the face detecting core 33 calculates the difference of luminance values of other pre-learnt two pixels. The face detecting core 33 decides a likelihood value that represents likelihood of a face of the square region image data based on the calculated differences of the luminance values. The face detecting core 33 sets a predetermined threshold value for likelihood values. If the likelihood value of square region image data is equal to or larger than the threshold value, the face detecting core 33 determines that the square region image data contain a face region. If the likelihood value is smaller than the threshold value, the face detecting core 33 determines that the square region image data do not contain a face region.

In the face determining process for the square region image obtained by scanning the reduced image data, the position of a face can be obtained from the reduced image data based on the likelihood value.

Figure 5:
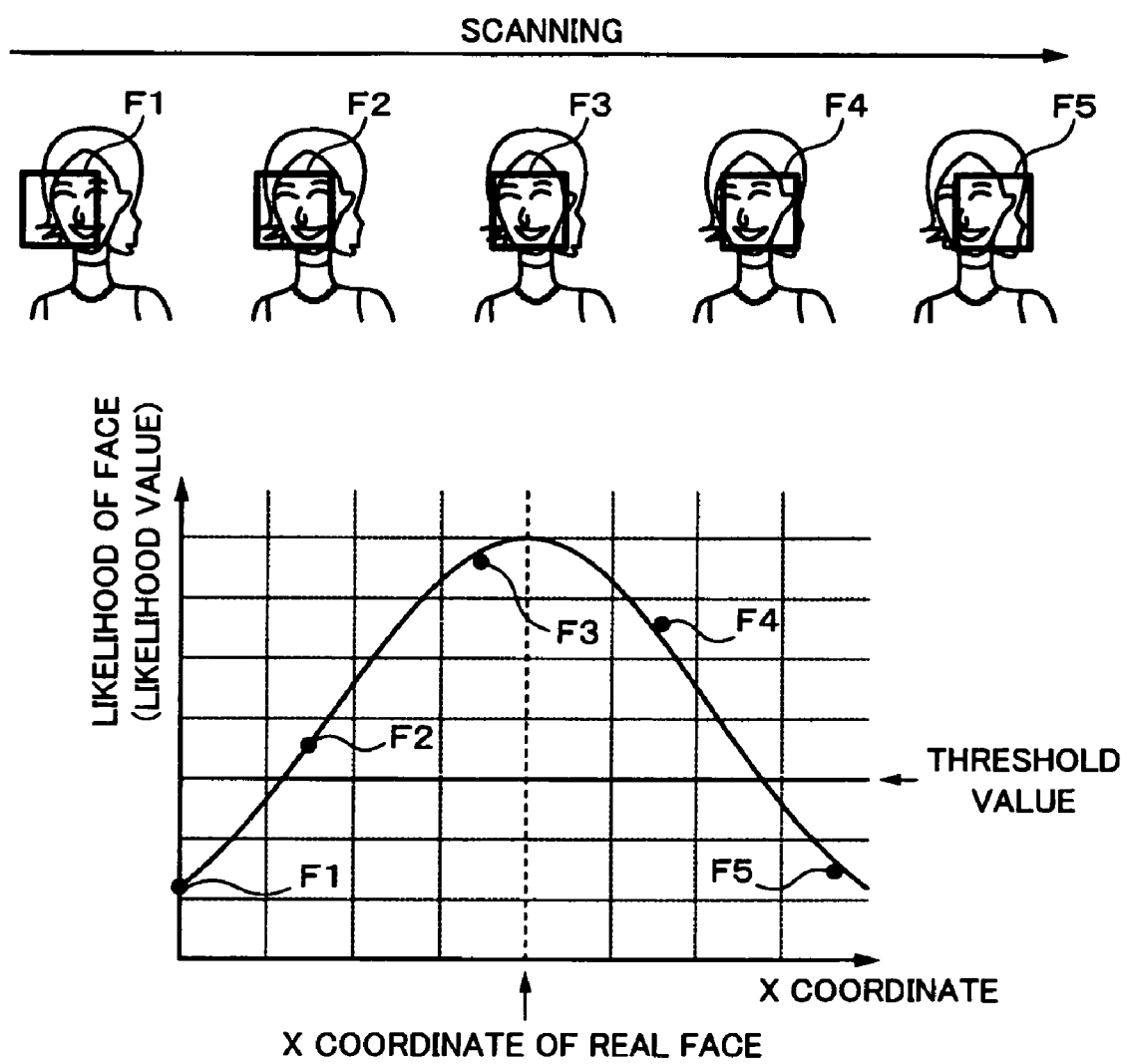
FIG. 5 is a schematic diagram describing likelihood values of square region image data in the case that image data are scanned in the horizontal direction.
Figure 6:
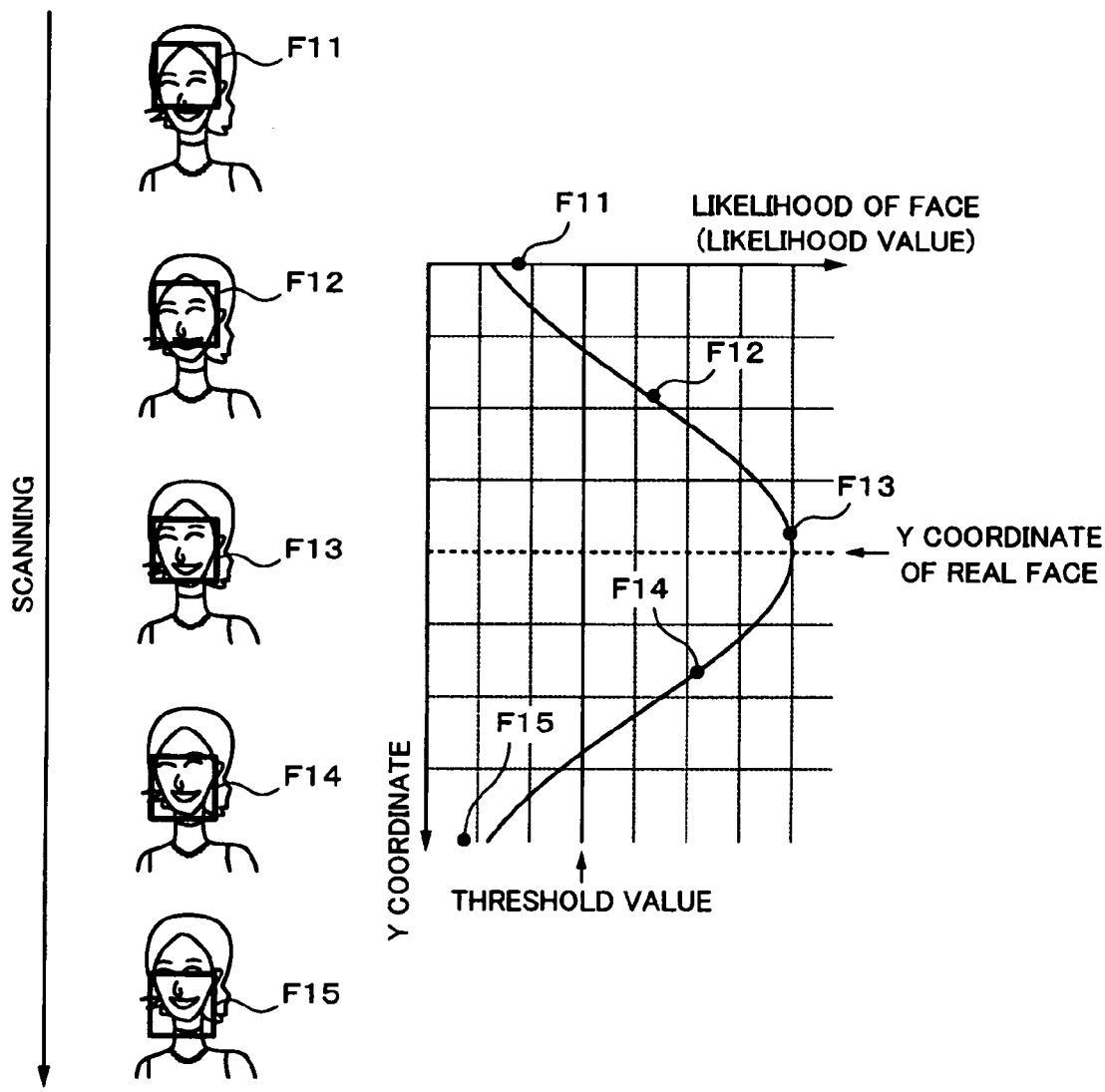
FIG. 6 is a schematic diagram describing likelihood values of square region image data in the case that image data are scanned in the vertical direction.

FIG. 5 is a graph showing likelihood values of square region image data in the case that the reduced image data are scanned in the horizontal direction. FIG. 6 is a graph showing likelihood values of square region image data in the case that image data are scanned in the vertical direction. As shown in FIG. 5 and FIG. 6, the closer the square region is to the position of the face of a person, the larger the likelihood value of square region image data is. If the likelihood value is equal to or larger than the threshold value, square region image data are determined to contain a face region. If the likelihood value is smaller than the threshold value, square region image data are determined not to contain a face region.

For example, when the reduced image data are scanned in the horizontal direction, since the likelihood values of square region image data F2, F3, and F4 are equal to or larger than the threshold value as shown in FIG. 5, the square region image data are determined to contain face regions as shown in FIG. 5. In contrast, since the likelihood values of square region image data F1 and F5 are smaller than the threshold value, the square region image data are determined not to contain face regions. In this example, since the likelihood value of square region image data F3 is the largest in the square region image data obtained in the scanning process, square region image data F3 are determined to be the closest to the position of the face.

On the other hand, when the reduced image data are scanned in the vertical direction, since the likelihood values of square region image data F12, F13, and F14 are equal to or larger than the threshold value as shown in FIG. 6, the square region image data are determined to contain face regions. In contrast, since the likelihood values of square region image data F11 and F15 are smaller than the threshold value, the square region image data are determined not to contain face regions. In this example, since the likelihood value of square region image data F13 is the largest in the square region image data obtained in the scanning process, square region image data F13 are determined to be the closest to the position of the real face.

By successively performing the face determining process for an reduced image that has been reduced by reduction rate Δr in the scaling process, the size of a face of the image data can be obtained.

Figure 7:
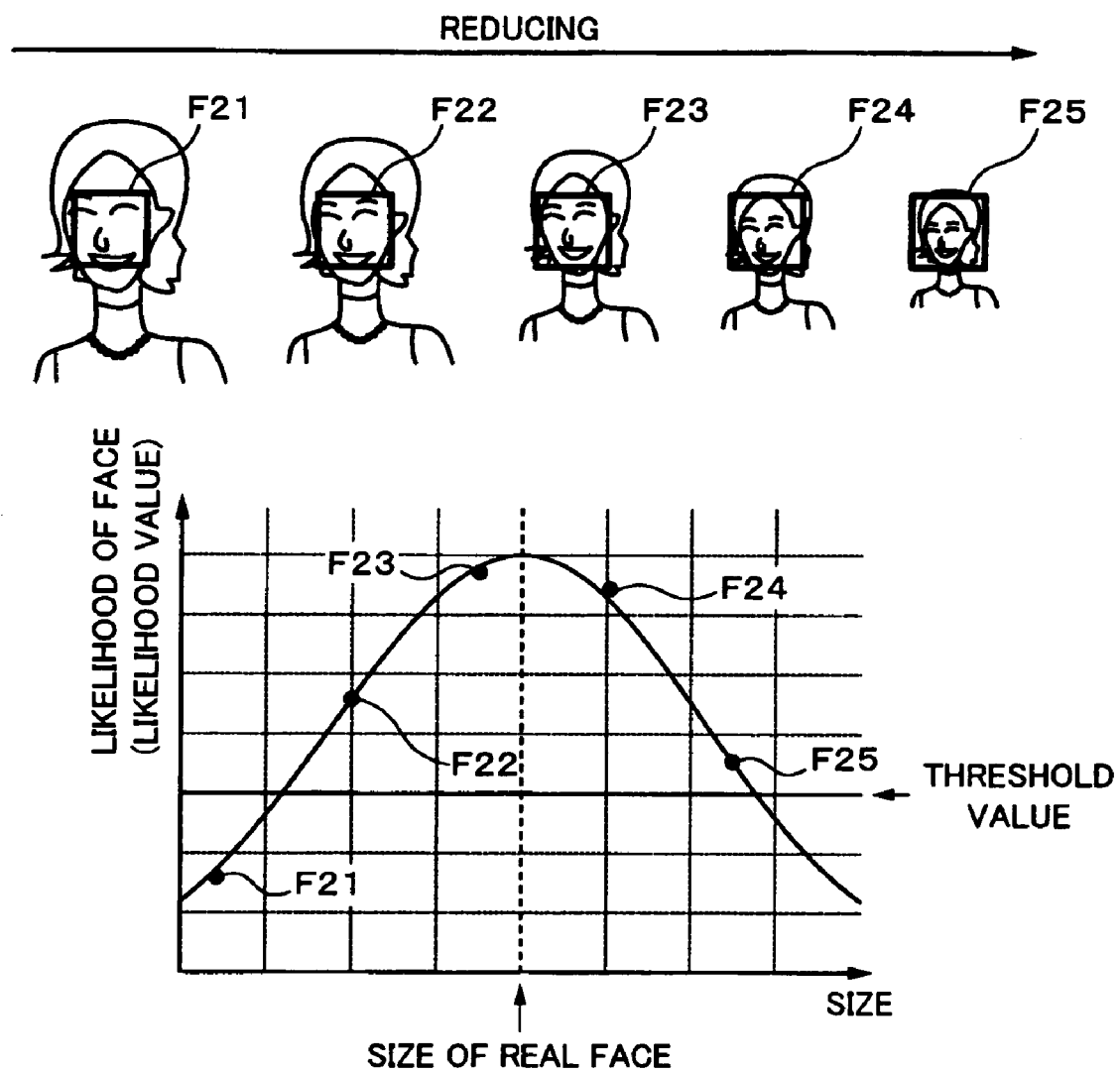
FIG. 7 is a schematic diagram describing likelihood values of square region image data in the case that image data are gradually reduced by a predetermined reduction rate.

FIG. 7 is a graph showing likelihood values of square region image data in the case that image data are gradually reduced at a predetermined reduction rate. As shown in FIG. 7, the closer the size of the square region is to the size of the face of a person, the larger the likelihood value of square region image data is. If the likelihood value is equal to or larger than the threshold value, the square region image data are determined to contain a face region. In contrast, if the likelihood value is smaller than the threshold value, the image data are determined not to contain a face region.

When image data are gradually reduced in the scaling process, since the likelihood values of square region image data F22, F23, F24, and F25 are equal to or larger than the threshold value as shown in FIG. 7, the square region image data are determined to contain face regions. In contrast, since the likelihood value of square region image data F21 is smaller than the threshold value, the square region image data are determined not to contain a face region. In this example, since the likelihood value of square region image data F23 is the largest in the reduced image data obtained in the scaling process, square region image data F23 is determined to be the closest to the size of the face.

The peak value of a graph that represents likelihood values depends on conditions of the face of a human. For example, the peak value depends on the hair style of the person, presence/absence of glasses, the intensity of light emitted to the face, and so forth.

As described in the section "Description of the Related Art", by setting moving amount Δx in the horizontal direction and moving amount Δy in the vertical direction of the square regions to as close to 0 as possible, setting reduction rate Δr to as close to 1 as possible, and nearly successively scanning image data, the detection accuracies of the position and size of the face can be improved. However, if image data are successively scanned, the number of times of the face determining process remarkably increases and the process time therefore becomes huge. To solve such a problem, image data are discretely scanned such that the number of times of the face determining process corresponds to the process time and accuracy thereof necessary for one entry of image data.

Thus, in this embodiment of the present invention, the scanning process is performed for a predetermined reduced image generated in the scaling process and the face determining process is successively performed for extracted square region image data. Whenever square region image data are determined to contain a face region, the next process, the overlap determining process, is performed for the square region image data. If the square region image data are determined not to contain a face region, the next square region image data are extracted in the scanning process and the face determining process is performed for the extracted square region image data.

After the face determining process has been performed for all square region image data of the predetermined reduced image, the next reduced image data are generated in the scaling process and the scanning process is performed for the generated reduced image data. Thereafter, the face determining process is successively performed for the extracted square region image data. By repeating the scaling process and the scanning process a predetermined number of times in such a manner, the face determining process is performed for the newly extracted square region image data.

(4) Overlap Determining Process

In the overlap determining process, with a face candidate database that stores square region image data as face candidates of image data that are input to the face detecting section 14 (these image data are referred to as face candidate image data), it is determined whether or not square region image data determined to contain a face region overlap with face candidate image data stored in the face candidate database.

Next, the face candidate database will be described. The face candidate database is stored in the image memory 32. As shown in FIG. 8, the face candidate database stores a plurality of face candidates determined to contain face regions in the face determining process, in this example, face candidate image data that are square region image data for n face candidates (where n is any integer).

In addition, the face candidate database stores a plurality of entries of face candidate image data determined to be data having larger likelihood values in the face determining process for one face candidate. In this example, the face candidate database stores three entries of face candidate image data having larger likelihood values for each candidate.

In each entry of face candidate image data, its likelihood value is correlated with and position information and size information of image data. As position information, for example, coordinates in the horizontal and vertical directions (X and Y coordinates) of a pixel at the upper left end of the square region are converted into those of image data captured by reduction rate Δr. As size information, for example, the numbers of pixels in the horizontal and vertical directions of the square region are converted into those of image data captured by reduction rate Δr.

For example, for face candidate 1, face candidate image data $P_{11}$ having X coordinate $X_{11}$, Y coordinate $Y_{11}$, size $S_{11}$, and likelihood value 11, face candidate image data $P_{12}$ having x coordinate $X_{12}$, Y coordinate $Y_{12}$, size $S_{12}$, and likelihood value 12, and face candidate image data $P_{13}$ having X coordinate $X_{13}$, Y coordinate $Y_{13}$, size $S_{13}$, and likelihood value 13 are stored. In this example, it is assumed that face candidate image data $P_{11}$, $P_{12}$, and $P_{13}$ have likelihood values 11, 12, and 13, respectively.

If the determined result in the face determining process denotes that square region image data extracted from reduced image data contain a face region, face candidate image data having the largest likelihood value, in this example, face candidate image data $P_{11}$ for face candidate 1, are read from face candidate image data for a predetermined face stored in the face candidate database. Thereafter, it is determined whether or not square region image data determined to be a face overlap with face candidate image data $P_{11}$ read from the face candidate database.

For example, a threshold value is set for an area of which square region image data determined to contain a face region overlap with face candidate image data that are read from the face candidate database. If the overlap area is equal to or larger than the threshold value, for example by 33% or larger, it is determined that the square region image data determined to contain a face region overlap with face candidate image data that are read from the face candidate database. In contrast, if the overlap area is smaller than the threshold value, for example by 33% or smaller, it is determined they do not overlap.

If it has been determined that the square region image data determined to contain a face region do not overlap with the face candidate image data read from the face candidate database, face candidate image data having the largest likelihood value in face candidate image data for the next face, in this example face candidate image data $P_{21}$ for face candidate 2, are read from the face candidate database. Likewise, the overlap determining process is performed for the overlap area.

Thereafter, if the determined result in the overlap determining process denotes that square region image data determined to contain a face region do not overlap with any entry of face candidate image data stored in the face candidate database, the square region image data determined to contain a face region are stored as face candidate image data for a new face candidate to the face candidate database.

If the face of a person is detected by scanning image data while changing its size, many entries of square region image data having different likelihood values are detected from the face. In other words, in the face determining process, a threshold value is set for likelihood values of square region image data such that they have a margin. Thus, if the likelihood value of square region image data exceeds the threshold value, it is determined that the square region image data be a face.

As a result, it is necessary to detect a correct face from many entries of square region image data that have been detected in such a manner. The overlap determining process aims to detect square region image data most similar to the face of a person in many entries of square region image data detected for the face of the person.

(5) Identity Determining Process

In the identity determining process, it is determined whether or not square region image data determined to overlap with face candidate image data stored in the face candidate database are the same image data as face candidate image data stored in the face candidate database.

Figure 9A:
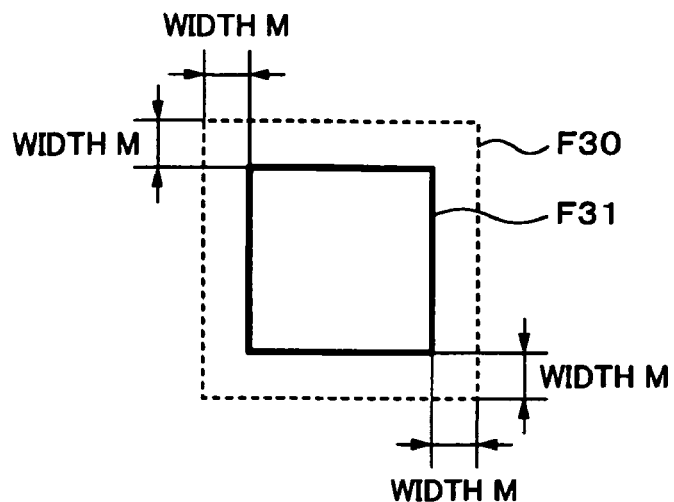
FIG. 9A, FIG. 9B, and FIG. 9C are schematic diagrams describing an identity determining process.

If the determined result in the identity determining process denotes that square region image data determined to contain a face region overlap with a predetermined entry of face candidate image data stored in the face candidate database in the overlap determining process, the face candidate image data determined to overlap in the overlap determining process are read from the face candidate database. As shown in FIG. 9A, identity determination frame F30 that is larger than square region F31 as face candidate image data that have been read by M in the horizontal and vertical directions is set. It is determined whether or not the square region image data determined to overlap are contained in identity determination frame F30.

Figure 9B:
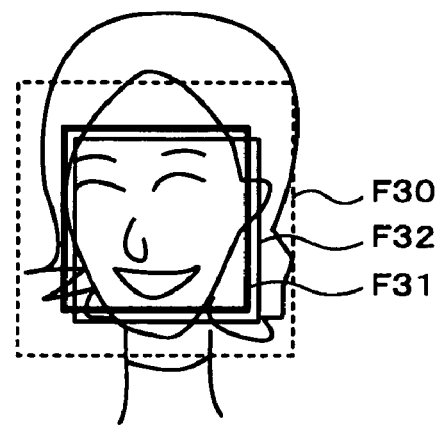

For example, as shown in FIG. 9B, if square region image data F32 determined to overlap are contained in identity determination frame F30, it is determined that square region image data F32 determined to overlap be square region image data for the same face as face candidate image data of square region image data F31.

Figure 9C:
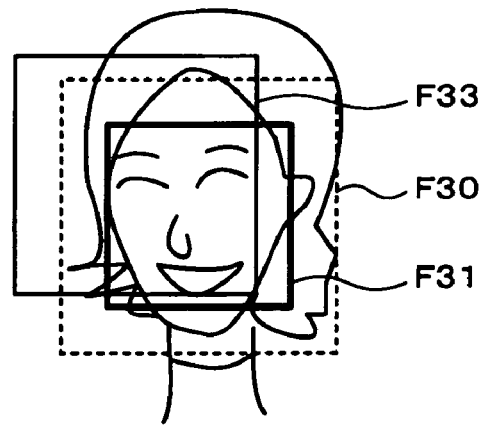

For example, as shown in FIG. 9C, if square region image data F33 determined to overlap are not contained in the identity determination frame F30, it is determined that square region image data F33 be not square region image data for the same face as face candidate image data of square region image data F31 or square region image data having a low likelihood value.

Width M of identity determination frame F30 may be changed depending on the sensitivity of the face detecting section 14. If the face detection accuracy of the face detecting section 14 is high, for example, width M is set to a large value. In contrast, if the detection accuracy is low, for example, width M is set to a small value. In other words, if the face detection accuracy in the face determining process of the face detecting section 14 is high, the ability of distinguishing a face to be determined from adjacent faces is high. If the face detection accuracy in the face determining process of the face detecting section 14 is low, the ability of distinguishing a face to be determined from adjacent faces is low. Thus, width m is set to a small value to narrow the distinguishing range and prevent an erroneous detection.

The peak value of a graph that represents likelihood values of the face of a person represents the position and size of the real face. For example, as shown in FIG. 10, if two persons a and b are close together and approach their faces to each other, the positions and sizes of persons a and b differ from each other. Thus, the peaks of graphs that represent likelihood values of the faces of the persons do not overlap.

Thus, in the identity determining process, by narrowing the detected result near to the peak of a graph with the identity determination frame, the face of an adjacent person can be prevented from being erroneously detected instead of the face of a person to be determined, for example the face of person b is erroneously detected instead of the face of person a.

(6) Detection Likelihood Determining Process

In the detection likelihood determining process, image data having a larger likelihood value, namely square region image data more similar to a real face, are selected from face candidate image data for a predetermined face candidate stored in the face candidate database and square region image data determined to be the same as these image data.

All three entries of face candidate image data having larger likelihood values for a predetermined face stored in the face candidate database and three entries of square region image data having larger likelihood values are selected from four entries of square region image data of these three entries of face candidate image data having larger likelihood values and one entry of square region image data determined to be the same face in the identity determining process. The selected three entries of square region image data are returned as new face candidate image data for the predetermined face to the face candidate database. The remaining one entry of square region image data that has not been selected is discarded.

(7) Detected Result Correcting Process

In the detected result correcting process, a region close to a real face region is detected based on three entries of face candidate image data having larger likelihood values for a predetermined face stored in the face candidate database.

By setting moving amount $\Delta x$ in the horizontal direction and moving amount $\Delta y$ in the vertical direction of a square region by which image data that are input to the face detecting section 14 is scanned to as close to 0 as possible and reduction rate $\Delta r$ of image data to as close to 1 as possible, detected results of the horizontal direction, vertical direction, and reduction rate are axially symmetrical with respect to the peaks of graphs of likelihood values as shown in FIG. 5, FIG. 6, and FIG. 7. In other words, it is thought that the position and size of a peak of a graph of likelihood values that represent the position and size of a real face are obtained by calculating the averages of all the detected results.

Thus, by calculating the averages of the positions and sizes of three entries of square region image data having larger likelihood values, even if the detected results are discrete, the position and size of a more real face can be obtained.

Figure 11A:
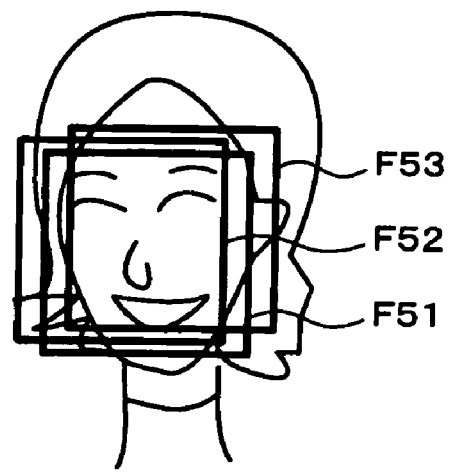
FIG. 11A and FIG. 11B are schematic diagrams describing a detected result correcting process.
Figure 11B:
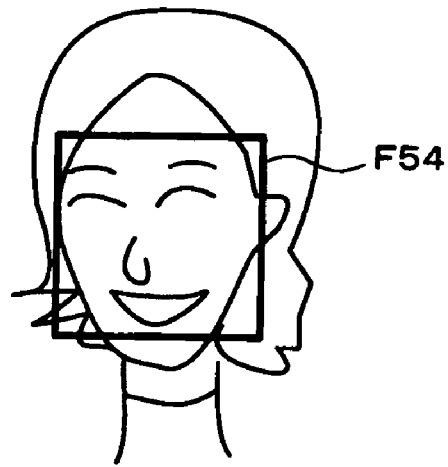

For example, as shown in FIG. 11A, if square region image data F51, F52, and F53 have been stored as three entries of face candidate image data having larger likelihood values for a predetermined face in the face candidate database, these face candidate image data are read from the face candidate database and the averages of horizontal positions, vertical positions, and sizes are calculated based on position information and size information correlated with their face candidate image data. As shown in FIG. 11B, square region F54 is detected as a region close to a real face region based on the calculated averages of the horizontal directions, vertical directions, and sizes.

When the horizontal positions of square regions F51, F52, and F53 are denoted by $X_{F51}$, $X_{F52}$, and $X_{F53}$, respectively, horizontal position $X_{F54}$ of square region F54 as the detected result is calculated based on formula (1).

$$X_{F54}=(X_{F51}+X_{F52}+X_{F53})/3 \quad (1)$$

When the vertical positions of square regions F51, F52, and F53 are denoted by $Y_{F51}$, $Y_{F52}$, and $Y_{F53}$, respectively, vertical position $Y_{F54}$ of square region F54 as the detected result is calculated based on formula (2).

$$Y_{F54}=(Y_{F51}+Y_{F52}+Y_{F53})/3 \quad (2)$$

When the sizes of square regions F51, F52, and F53 are denoted by $S_{F51}$, $S_{F52}$, and $S_{F53}$, respectively, size $S_{F54}$ of the square region F54 as the detected result is calculated based on formula (3).

$$S_{F54}=(S_{F51}+S_{F52}+S_{F53})/3 \quad (3)$$

In the detected result correcting process, by calculating the averages of horizontal positions, vertical positions, and sizes of square regions of a predetermined face based on position information and size information correlated with three entries of face candidate image data having larger likelihood values for the predetermined face stored in the face candidate database, a region closer to the real face can be detected.

The process of calculating averages of positions and sizes of three entries of face candidate image data for a real face is performed for all face candidates stored in the face candidate database. Thus, regions closer to a plurality of real faces detected from image data that have been input can be detected.

Figure 12:
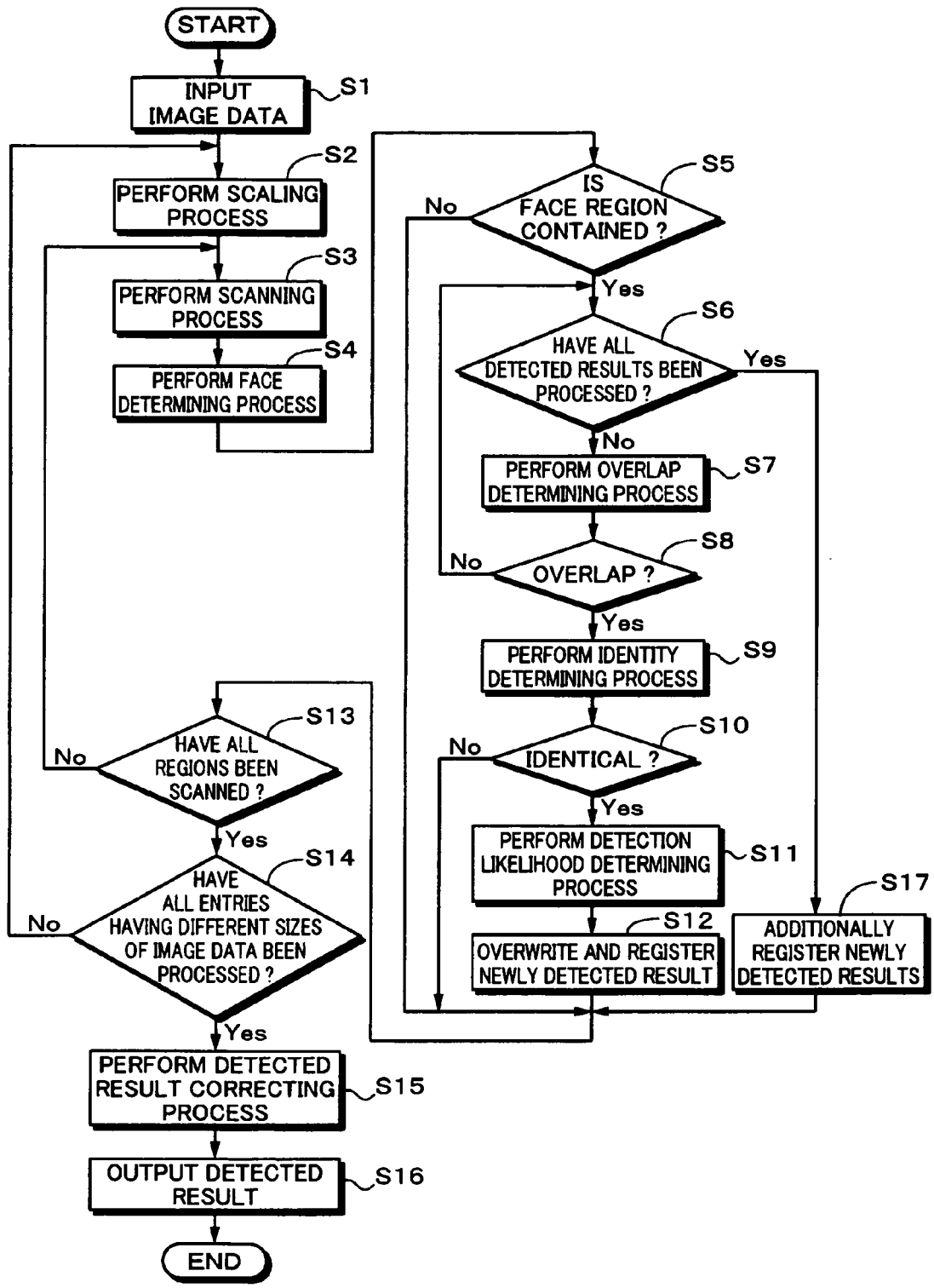
FIG. 12 is a flow chart describing a flow of a face detecting process of a face detecting section.

Next, with reference to a flow chart shown in FIG. 12, a flow of the face detecting process of the face detecting section 14 will be described. At step S1, captured image data are input to the face detecting section 14 through the image RAM 19. At step S2, the scaling process is performed for the image data that are input to the face detecting section 14. As a result, reduced image data of which the image data have been reduced by predetermined reduction rate $\Delta r$ are generated. The generated reduced image data are stored in the image memory 32.

At step S3, the scanning process is performed for the reduced image data stored in the image memory 32. By moving a square region having a predetermined size from the upper left end to the lower right end of the reduced image data by $\Delta x$ in the horizontal direction and $\Delta y$ in the vertical direction, square region image data are extracted.

At step S4, the face determining process is performed for the square region image data that have been extracted in the scanning process. The predetermined calculating process is performed for the square region image data to determine whether or not the square region image data contain a face region. If the determined result at step S5 denotes that the square region image data contain a face region, the flow advances to step S6.

At step S6, it is determined whether or not the overlap determining process has been performed for the square region image data determined to contain a face region in the face determining process and face candidate image data for all face candidates stored in the face candidate database. If the determined result denotes that the overlap determining process has not been performed for face candidate image data for all the face candidates, the flow advances to step S7.

At step S7, the overlap determining process is performed for square region image data determined to contain a face region in the face determining process to determine whether or not square region image data determined to be a face overlap with face candidate image data stored in the face candidate database. If the determined result at step S8 denotes that square region image data determined to be a face overlap with face candidate image data stored in the face candidate database, the flow advances to step S9.

In contrast, if the determined result at step S8 denotes that square region image data determined to contain a face region do not overlap with face candidate image data stored in the face candidate database, the flow returns to step S7 through step S6. At step S7, the overlap determining process is performed for square region image data determined to be a face and the next entry of face candidate image data stored in the face candidate database.

At step S9, the identity determining process is performed for square region image data determined to overlap with face candidate image data stored in the face candidate database to determine whether or not the square region image data determined to overlap with the face candidate image data are image data identical to face candidate image data stored in the face candidate database. If the determined result at step S10 denotes that square region image data determined to overlap with face candidate image data stored in the face candidate database are identical to face candidate image data stored therein in the identity determining process, the flow advances to step S11.

At step S11, the detection likelihood determining process is performed for square region image data determined to be identical to face candidate image data stored in the face candidate database to select a predetermined number of entries of image data having larger likelihood values from all entries of face candidate image data for a predetermined number of face candidates stored in the face candidate database and square region image data determined to be identical to face candidate image data for the predetermined number of face candidates stored in the face candidate database. At step S12, the selected ones of the predetermined number of entries of image data are overwritten as new entries of face candidate image data to the face candidate database.

In contrast, if the determined result at step S6 denotes that the overlap determining process has been performed for square region image data determined to contain a face region in the face determining process and all entries of face candidate image data stored in the face candidate database, the flow advances to step S17. At step S17, the square region image data determined to contain a face region are stored as face candidate image data for a new face candidate to the face candidate database.

If the determined result at step S5 denotes that square region image data extracted in the scanning process do not contain a face region or if the determined result at step S10 denotes that image data determined to overlap with face candidate image data stored in the face candidate database are not identical to face candidate image data stored in the face candidate database, the flow advances to step S13.

At step S13, it is determined whether or not all regions of reduced image data generated in the scaling process have been scanned by a square region. If the determined result at step S13 denotes that all the regions of reduced image data have been scanned, the flow advances to step S14.

In contrast, if the determined result at step S13 denotes that all the regions of an enlarged image or reduced image generated in the scaling process have not been scanned, the flow returns to step S3. At step S3, the scanning process is performed. Thereafter, the foregoing processes are performed for the next square region image data that have been obtained in the scanning process.

At step S14, it is determined whether or not all entries having different sizes of image data that have been set have been processed. If the determined result denotes that all the entries having different sizes of image data have been processed, the flow advances to step S15. In contrast, if the determined result denotes that all the entries having different sizes of image data have not been processed, the flow returns to step S2. At step S2, the foregoing processes are performed for enlarged or reduced image data.

At step S15, the detected result correcting process is performed for a plurality of entries of face candidate image data that have larger likelihood values and that are stored in the face candidate database. The averages of positions and sizes of faces are calculated based on formulas (1), (2), and (3). At step S16, information about the positions and sizes of faces obtained as detected results is output to the CPU 21 and the face detecting process is completed.

Thus, according to this embodiment of the present invention, only a plurality of entries of square region image data having larger likelihood values for a predetermined face of square region image data detected for the predetermined face are stored. The averages of positions and sizes of these entries of square region image data are calculated and a face region is detected based on the calculated results. Thus, a region closer to a real face region can be detected as a face.

In addition, according to this embodiment of the present invention, since image data detected nearly at the peak of a graph representing likelihood values, namely nearly at the position and with the size of the real face, is treated as face candidate image data, another face adjacent to the face to be determined can be prevented from being erroneously detected. Thus, a face detection error can be decreased.

It should be understood by those skilled in the art that various modifications, combinations, sub-combinations and alternations may occur depending on design requirements and other factors insofar as they are within the scope of the appended claims or the equivalents thereof. For example, the number of entries of face candidate image data for each face candidate is not limited to three. In other words, the number of entries of face candidate image data can be increased or decreased depending on the storage capacity of the image memory 32.

Furthermore, the embodiments of the present invention are also applicable to the cases where other objects are detected and object recognition is performed. For example, the embodiments of the present invention are applicable to various objects, such as pets and animals including cats and dogs, houses, and vehicles.

What is claimed is:

1. An image processing apparatus, comprising:
    an image converting section which converts a size of input image data;
    a scanning controlling section which stores the size-converted image data, performs a scanning process of moving a square region having a predetermined size in the size-converted image data, and successively extracts square region image data;
    an image memory which stores the square region image data which have been extracted by the scanning controlling section; and
    a face detection processing section which detects a face region from the extracted square region image data,
    wherein the image memory stores a plurality of entries of face candidate image data containing face regions of a plurality of face candidates, and
    wherein the face detection processing section performs a face determining process of determining whether or not the square region image data contain a face region, and
    wherein if a determined result of the face determining process denotes that the square region image data contain the face region, the face detection processing section performs an identity determining process of setting an identity determination frame of which a predetermined width in a horizontal direction and a predetermined width in a vertical direction are added to face candidate image data for a predetermined face candidate stored in the image memory and determining whether or not the square region image data are contained in the identity determination frame.

2. The image processing apparatus as set forth in claim 1, wherein the face detection processing section performs an overlap determining process of comparing face candidate image data for the predetermined face candidate stored in the image memory with the square region image data and determining whether or not these image data overlap by a predetermined area rate, and wherein if a determination result of the overlap determining process denotes that the image data overlap, the face detection processing section further performs the identity determining process for the square region image data.

3. The image processing apparatus as set forth in claim 2, wherein if the determination result of the overlap determining process denotes that the face candidate image data for the predetermined face candidate do not overlap with the square region image data, the face detection processing section determines whether or not the face candidate image data for a next face candidate overlap with the square region image data.

4. The image processing apparatus as set forth in claim 3, wherein if the determined result of the overlap determining process denotes that the face candidate image data for all face candidates do not overlap with the square region image data, the face detection processing section stores the square region image data as the face candidate image data for a new face candidate to the image memory.

5. The image processing apparatus as set forth in claim 1, wherein position information, size information, and a likelihood value that represents likelihood of a face of the face candidate image data are correlated with the face candidate image data and stored in the image memory.

6. The image processing apparatus as set forth in claim 5, wherein if a determined result of the identity determining process denotes that the square region image data are contained in the identity determination frame, the face detection processing section performs a detection likelihood determining process of selecting a predetermined number of entries of image data having larger likelihood values representing the likelihood of a face from the plurality number of entries of face candidate image data for the predetermined face candidate stored in the image memory and the square region image data and stores the selected predetermined number of entries of image data as new face candidate image data for the predetermined face candidate to the image memory.

7. The image processing apparatus as set forth in claim 6, wherein the face detection processing section performs the detection likelihood determining process of selecting three entries of image data having larger likelihood values from the plurality of number of entries of face candidate image data for the predetermined face candidate stored in the image memory and the square region image data.

8. The image processing apparatus as set forth in claim 6, wherein the face detection processing section performs a detected result correcting process of calculating averages of positions and sizes of the plurality of entries of face candidate image data based on position information and size information of the plurality of entries of face candidate image data stored in the image memory.

9. An image processing method, comprising the steps of:
converting a size of input image data by use of an image converting section;
storing the size-converted image data to an image memory, performing a scanning process of moving a square region having a predetermined size in the size-converted image data, and successively extracting square region image data by use of a scanning control section; and
detecting a face region from the extracted square region image data by use of a face detecting section,
wherein the image memory stores a plurality of entries of face candidate image data containing face regions of a plurality of face candidates, and
wherein the detecting step includes:
a face determining process of determining whether or not the square region image data contain a face region, and
if a determined result of the face determining process denotes that the square region image data contain the face region, an identity determining process of setting an identity determination frame of which a predetermined width in a horizontal direction and a predetermined width in a vertical direction are added to face candidate image data for a predetermined face candidate stored in the image memory and determining whether or not the square region image data are contained in the identity determination frame.

10. A non-transitory computer readable memory having stored thereon an image processing program which causes a computer to execute an image processing method, comprising the steps of:
converting a size of input image data;
storing the size-converted image data to an image memory, performing a scanning process of moving a square region having a predetermined size in the size-converted image data, and successively extracting square region image data; and
detecting a face region from the extracted square region image data,
wherein the image memory stores a plurality of entries of face candidate image data containing face regions of a plurality of face candidates, and
wherein the face detection processing section includes:
a face determining process of determining whether or not the square region image data contain a face region, and
if a determined result of the face determining process denotes that the square region image data contain the face region, an identity determining process of setting an identity determination frame of which a predetermined width in a horizontal direction and a predetermined width in a vertical direction are added to face candidate image data for a predetermined face candidate stored in the image memory and determining whether or not the square region image data are contained in the identity determination frame.

11. An image capturing apparatus, comprising:
an image capturing section which captures light from an object and outputs a captured image signal;
a camera signal processing section which performs a signal process for the captured image signal which is output from the image capturing section and outputs image data; and
a face detecting section which performs a face detecting process for the image data,
wherein the face detecting section includes:
an image converting section which converts a size of the image data;
a scanning controlling section which stores the size-converted image data, performs a scanning process of moving a square region having a predetermined size in the size-converted image data, and successively extracts square region image data;

an image memory which stores the square region image data which have been extracted by the scanning controlling section; and a face detection processing section which detects a face region from the extracted square region image data, wherein the image memory stores a plurality of entries of face candidate image data containing face regions of a plurality of face candidates, and wherein the face detection processing section performs a face determining process of determining whether or not the square region image data contain a face region, and wherein if a determined result of the face determining process denotes that the square region image data contain the face region, the face detection processing section performs an identity determining process of setting an identity determination frame of which a predetermined width in a horizontal direction and a predetermined width in a vertical direction are added to face candidate image data for a predetermined face candidate stored in the image memory and determining whether or not the square region image data are contained in the identity determination frame.

12. A controlling method of an image capturing apparatus, comprising the steps of:

capturing light from an object and outputting a captured image signal by use of an image capturing section;

performing a signal process for the captured image signal which is output at the image capturing step and outputting image data by use of a camera signal processing section; and performing a face detecting process for the image data by use of a face detecting section, wherein the performing the face detecting step includes steps of:

converting a size of the image data;

storing the size-converted image data to an image memory, performing a scanning process of moving a square region having a predetermined size in the size-converted image data, and successively extracting square region image data; and detecting a face region from the extracted square region image data, wherein the image memory stores a plurality of entries of face candidate image data containing face regions of a plurality of face candidates, and wherein the face detection processing step includes:

a face determining process of determining whether or not the square region image data contain a face region, and if a determined result of the face determining process denotes that the square region image data contain the face region, an identity determining process of setting an identity determination frame of which a predetermined width in a horizontal direction and a predetermined width in a vertical direction are added to face candidate image data for a predetermined face candidate stored in the image memory and determining whether or not the square region image data are contained in the identity determination frame.

13. An image processing apparatus, comprising:

an image converting section which converts a size of input image data;

a scanning controlling section which stores the size-converted image data, performs a scanning process of moving a square region having a predetermined size in the size-converted image data, and successively extracts square region image data;

an image memory which stores the square region image data which have been extracted by the scanning controlling section; and an object detection processing section which detects an object region from the extracted square region image data, wherein the image memory stores a plurality of entries of object candidate image data containing the object regions of a plurality of object candidates, and wherein the object detection processing section performs an object determining process of determining whether or not the square region image data contain a object region, and wherein if a determined result of the object determining process denotes that the square region image data contain the object region, the object detection processing section performs an identity determining process of setting an identity determination frame of which a predetermined width in a horizontal direction and a predetermined width in a vertical direction are added to object candidate image data for a predetermined object candidate stored in the image memory and determining whether or not the square region image data are contained in the identity determination frame.

* * * * *